US006930079B2

(12) United States Patent
Deak et al.

(10) Patent No.: US 6,930,079 B2
(45) Date of Patent: Aug. 16, 2005

(54) PROCESS FOR TREATING A LIPOPHILIC FLUID

(75) Inventors: John Christopher Deak, West Chester, OH (US); Paul Amaat France, West Chester, OH (US); Kristina Marie Rohal Gansle, Cincinnati, OH (US); Anna Vadimovna Noyes, Hamilton, OH (US); Arseni V. Radomyselski, Hamilton, OH (US); John Cort Severns, West Chester, OH (US); Christiaan Arthur Jacques Kamiel Thoen, West Chester, OH (US); Jean Wevers, Steenhuffel (BE)

(73) Assignee: Procter & Gamble Company, Cincinnati, OH (US)

( * ) Notice: Subject to any disclaimer, the term of this patent is extended or adjusted under 35 U.S.C. 154(b) by 639 days.

(21) Appl. No.: 09/849,963

(22) Filed: May 4, 2001

(65) Prior Publication Data

US 2002/0004952 A1 Jan. 17, 2002

Related U.S. Application Data

(60) Provisional application No. 60/280,074, filed on Mar. 30, 2001, provisional application No. 60/241,174, filed on Oct. 17, 2000, provisional application No. 60/209,468, filed on Jun. 5, 2000, provisional application No. 60/209,444, filed on Jun. 5, 2000, provisional application No. 60/209,443, filed on Jun. 5, 2000, and provisional application No. 60/209,250, filed on Jun. 5, 2000.

(51) Int. Cl.$^7$ .................................................. C11D 3/44
(52) U.S. Cl. ...................... 510/285; 510/276; 510/282; 510/287; 510/330; 510/407; 510/408; 510/417; 510/432; 510/515; 8/142; 8/149.1; 134/10; 134/11; 134/12; 134/13; 134/34
(58) Field of Search ................................ 510/276, 282, 510/285, 287, 330, 407, 408, 417, 432, 515; 8/142, 149.1; 134/10, 11, 12, 13, 34

(56) References Cited

U.S. PATENT DOCUMENTS

| | | | |
|---|---|---|---|
| 3,395,086 A | | 7/1968 | Victor |
| 3,692,467 A | * | 9/1972 | Durr et al. ............... 8/158 |
| 3,839,176 A | | 10/1974 | McCoy et al. |
| 4,097,397 A | | 6/1978 | Mizutani et al. |
| 4,102,824 A | | 7/1978 | Mizutani et al. |
| 4,108,599 A | | 8/1978 | Coll-Palagos et al. |
| 4,267,077 A | | 5/1981 | Niimi et al. |
| 4,664,754 A | | 5/1987 | Caputi et al. |
| 4,708,807 A | | 11/1987 | Kemerer |
| 4,909,962 A | | 3/1990 | Clark |
| 5,037,485 A | | 8/1991 | Chromecek et al. |
| 5,057,240 A | | 10/1991 | Madore et al. |
| 5,116,426 A | | 5/1992 | Yokohama et al. |
| 5,271,775 A | | 12/1993 | Asano et al. |
| 5,302,313 A | | 4/1994 | Asano et al. |
| 5,360,571 A | | 11/1994 | Kilgour et al. |
| 5,443,747 A | | 8/1995 | Inada et al. |
| 5,503,681 A | | 4/1996 | Inada et al. |
| 5,503,778 A | | 4/1996 | Liu et al. |
| 5,520,827 A | | 5/1996 | Danner |

(Continued)

FOREIGN PATENT DOCUMENTS

| | | |
|---|---|---|
| CA | 1 239 326 | 7/1988 |
| DE | 3739711 A1 | 6/1989 |
| EP | 0 479 146 B1 | 12/1996 |
| EP | 0841 362 A2 | 5/1998 |
| EP | 1 041 189 A1 | 10/2000 |
| EP | 1 092 803 A1 | 4/2001 |
| JP | 1098-708 A | 5/1986 |
| JP | 61-085995 | 5/1986 |
| JP | 3046-300 A | 2/1988 |
| JP | 3063-799 A | 3/1988 |
| JP | 1188-595 A | 7/1989 |
| JP | 2166-198 A | 6/1990 |
| JP | 2202-599 A | 8/1990 |
| JP | 2222-496 A | 9/1990 |
| JP | 04323299 A | 11/1992 |
| JP | 0501598 A | 3/1993 |
| JP | 05239766 A | 9/1993 |
| JP | 08073837 A | 3/1996 |
| JP | 09143497 A | 6/1997 |
| JP | 10-017891 | 1/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 | 7/2000 |
| JP | 00290689 A | 10/2000 |
| WO | WO 99/57358 | 11/1999 |
| WO | WO 00/04221 | 1/2000 |
| WO | WO 00/04222 | 1/2000 |
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |

OTHER PUBLICATIONS

US 6,001,133, 12/1999, DeYoung et al. (withdrawn)
Trilo et al.; "Critical Micelle Density for the Self–Assembly of Block Copolymer Surfactants in Supercritical Carbon Dioxide"; pp. 416–421.
Sarbu et al.; "Non–Fluorous Polymers With Very High Solubility in Supercritical $CO_2$ Down to Low Pressures"; pp. 165–168.

*Primary Examiner*—Charles I. Boyer
(74) *Attorney, Agent, or Firm*—Caroline Wei-Berk; C. Brant Cook; Kim W. Zerby

(57) ABSTRACT

The present invention relates to a process for treating a lipophilic fluid contained in an emulsion of water and lipophilic fluid. The process includes the steps of pretreating the emulsion, removing lipophilic fluid from the emulsion, and purifying the lipophilic fluid to remove at least a portion of the impurities collected during the use of the emulsion. Method options are provided for each of the aforementioned steps.

16 Claims, No Drawings

U.S. PATENT DOCUMENTS

| | | |
|---|---|---|
| 5,593,507 A | 1/1997 | Inada et al. |
| 5,597,792 A | 1/1997 | Klier et al. |
| 5,628,833 A | 5/1997 | McCormack et al. |
| 5,676,705 A | 10/1997 | Jureller et al. |
| 5,683,473 A | 11/1997 | Jureller et al. |
| 5,683,977 A | 11/1997 | Jureller et al. |
| 5,690,750 A | 11/1997 | Inada et al. |
| 5,705,562 A | 1/1998 | Hill |
| 5,707,613 A | 1/1998 | Hill |
| 5,716,456 A | 2/1998 | Inada et al. |
| 5,722,781 A | 3/1998 | Yamaguchi |
| 5,741,365 A | 4/1998 | Inada et al. |
| 5,769,962 A | 6/1998 | Inada et al. |
| 5,783,092 A | 7/1998 | Brown et al. |
| 5,811,383 A | 9/1998 | Klier et al. |
| 5,858,022 A | 1/1999 | Romack et al. |
| 5,865,852 A | 2/1999 | Berndt |
| 5,866,005 A | 2/1999 | DeSimone et al. |
| 5,876,510 A | 3/1999 | Kuemin et al. |
| 5,877,133 A | 3/1999 | Good |
| 5,882,506 A | 3/1999 | Ohsol et al. |
| 5,888,250 A | 3/1999 | Hayday et al. |
| 5,929,012 A | 7/1999 | Del Duca et al. |
| 5,942,007 A | 8/1999 | Berndt et al. |
| 5,944,996 A | 8/1999 | DeSimone et al. |
| 5,954,869 A | 9/1999 | Elfersy et al. |
| 5,977,040 A | 11/1999 | Inada et al. |
| 5,977,045 A | 11/1999 | Murphy |
| 5,985,810 A | 11/1999 | Inada et al. |
| 6,013,683 A | 1/2000 | Hill et al. |
| 6,042,617 A | 3/2000 | Berndt |
| 6,042,618 A | 3/2000 | Berndt et al. |
| 6,056,789 A | 5/2000 | Berndt et al. |
| 6,059,845 A | 5/2000 | Berndt et al. |
| 6,060,546 A | 5/2000 | Powell et al. |
| 6,063,135 A * | 5/2000 | Berndt et al. .................. 8/142 |
| 6,086,635 A | 7/2000 | Berndt et al. |
| 6,114,295 A | 9/2000 | Murphy |
| 6,131,421 A | 10/2000 | Jureller et al. |
| 6,136,766 A | 10/2000 | Inada et al. |
| 6,148,644 A | 11/2000 | Jureller et al. |
| 6,156,074 A | 12/2000 | Hayday et al. |
| 6,177,399 B1 | 1/2001 | Mei et al. |
| 6,200,352 B1 | 3/2001 | Romack et al. |
| 6,200,393 B1 | 3/2001 | Romack et al. |
| 6,200,943 B1 | 3/2001 | Romack et al. |
| 6,204,233 B1 | 3/2001 | Smith et al. |
| 6,228,826 B1 | 5/2001 | DeYoung et al. |
| 6,242,408 B1 | 6/2001 | Elms et al. |
| 6,310,029 B1 | 10/2001 | Kilgour et al. |
| 6,312,476 B1 | 11/2001 | Perry et al. |
| 6,313,079 B1 | 11/2001 | Murphy et al. |
| 6,368,359 B1 * | 4/2002 | Perry et al. .................... 8/142 |
| 2002/0017493 A1 | 2/2002 | Ehrnsperger et al. |
| 2002/0038480 A1 | 4/2002 | Deak et al. |
| 2002/0184715 A1 | 12/2002 | Taylor et al. |

* cited by examiner

PROCESS FOR TREATING A LIPOPHILIC FLUID

CROSS REFERENCE TO RELATED APPLICATIONS

This application claims priority under Title 35, United States Code 35 U.S.C. 119(e) from Provisional Application Ser. Nos. 60/209,250; 60/209,468; 60/209,443; and 60/209,444 all filed on Jun. 5, 2000; No. 60/241,174 filed on Oct. 17, 2000; and No. 60/280,074, filed on Mar. 30, 2001.

FIELD OF THE INVENTION

The present invention relates to a process for treating a lipophilic fluid contained in an emulsion of water and lipophilic fluid. The process includes the steps of pretreating the emulsion, removing lipophilic fluid from the emulsion, and purifying the lipophilic fluid to remove at least a portion of the impurities collected during the use of the emulsion. Method options are provided for each of the aforementioned steps.

BACKGROUND OF THE INVENTION

Conventional laundering techniques for the cleaning and treatment of fabric articles such as garments have long involved both traditional aqueous based washing and a technique commonly referred to as "dry cleaning". Traditional aqueous based washing techniques have involved immersion of the fabric articles in a solution of water and detergent or soap products followed by rinsing and drying. However, such conventional immersion cleaning techniques have proven unsatisfactory on a wide range fabric articles that require special handling and/or cleaning methods due to a fabric content, construction, etceteras, that is unsuitable for immersion in water.

Accordingly, the use of the laundering method of "dry cleaning" has been developed. Dry cleaning typically involves the use of non-aqueous, lipophilic fluids as the solvent or solution for cleaning. In this manner, fabrics that are incompatible with water immersion may be cleaned and treated without the potential disastrous side effects water may present.

While a broad range of non-aqueous lipophilic fluids are available, many require the presence of low levels of water in the form of emulsions or microemulsions to maximize cleaning efficiency without sacrificing the "safety" accorded fabrics via dry cleaning. In addition, it is desirable to re-cycle and/or purify the non-aqueous, lipophilic fluids to reduce the much higher operating cost associated with dry cleaning as opposed to its aqueous based cousin. Re-cycling of the lipophilic fluids can pose special challenges when water, stains, and body soils are also present in the emulsion after its use. However, re-cycling presents special problems particularly when equipment space, cost, and safety issues are present. Thus, a cost-effective, efficient, and safe way to process or purify the lipophilic fluids after their use is desired, particularly when water and adjuncts such as emulsifiers are utilized.

Traditional separation techniques for dry cleaning solvent/water emulsions and/or mixtures typically involve distillation of all solvent-containing fluids, including those that do not require it. In this regard, distillation is used not only to remove impurities such as body soils from the post-use dry cleaning solvent, but is also used to separate solvent from water—a function that can be carried out in other ways. Distillation often involves high operating costs in the form of energy and equipment necessary to achieve the separation and, thus is undesirable in many instances, particularly when the equipment is within a consumer's home. Lastly, as noted, distillation is not necessary for all solvent-containing fluids arising from dry-cleaning. For example, evaporated solvent-water mixtures do not necessarily require distillation since they are substantially "impurity-free" and only require water-solvent separation operations.

Accordingly, the need remains for a cost effective, efficient, and safe method to treat lipophilic fluids post-use, particularly when water and emulsifiers are present.

SUMMARY OF THE INVENTION

The present invention provides methods for treating lipophilic fluids post-use in a cost effective, efficient, and safe manner.

In a first embodiment, the present invention provides a process for treating a lipophilic fluid contained in an emulsion of water and at least one lipophilic fluid. The process has three main steps. The steps are pre-treating the emulsion, recovering the lipophilic fluid from the emulsion, and purifying the lipophilic fluid.

In a second embodiment, the present invention provides a process for purifying a lipophilic fluid and a lipophilic fluid vapor. The process includes collecting the lipophilic fluid vapor and a first emulsion having water and lipophilic fluid, condensing the lipophilic fluid vapor, combining the condensed lipophilic fluid vapor and first emulsion to form a second emulsion, pre-treating the second emulsion, recovering lipophilic fluid from the second emulsion, and purifying the lipophilic fluid.

These and other aspects, features, and advantages will become apparent to those of ordinary skill in the art from the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are, in relevant part, incorporated herein by reference.

DETAILED DESCRIPTION OF THE INVENTION

Definitions

The term "lipophilic fluid" used herein is intended to encompass any non-aqueous fluid or vapor capable of removing sebum, as qualified by the test described below.

The term "fabrics" and "fabric" used herein is intended to mean any article that is customarily cleaned in a water-based laundry process or in a solvent-based dry cleaning process. As such the term encompasses bulk fabrics and fibers, as well as finished articles of clothing, linens, drapery, and clothing accessories. The term also encompasses other items made in whole or in part of fabric, such as tote bags, furniture covers, tarpaulins and the like.

The term "absorbent material" or "absorbent polymer" used herein is intended to mean any material capable of selectively absorbing or adsorbing water and/or water-containing liquids without absorbing lipophilic fluids as described in detail. In the art they may also be referred to as "responsive gels," "gel," and "polymeric gel." For a list of phase changing gels, see the textbook *Responsive Gels, Volume Transitions II*, Ed K. Dusek, Springer Verlag Berlin, 1993 (herein incorporated by reference). See also, *Thermoresponsive Gels*, Radiat. Phys. Chem., Volume 46, No. 2, pp.185–190, Elsevier Science Ltd. Great Britain, 1995

(herein incorporated by reference). Super absorbent polymers, also suitable for use with the present invention, are polymeric materials that have an absorption capacity at or above 5 grams/gram. See also, *Superabsorbent Polymers Science and Technology*, edited by Fredric L. Buchholz and Nicholas A. Peppas, American Chemical Society, Washington D.C., 1994 (particularly Chapter 9 by Tadao Shimomura and Takashi Namba entitled "Preparation and Application of High-Performance Superabsorbent Polymers) herein incorporated by reference.

The term "absorbent matrix permeability aid" or "spacer material" or "spacer" used herein is intended to mean any fibrous or particulate material that is not soluble in water.

The term "absorbent matrix" used herein is intended to mean a matrix in any form that is capable of absorbing or adsorbing water. At minimum, it comprises an absorbent material. It may optionally comprise a spacer material and/or a high surface area material.

Lipophilic Fluid

In general, lipophilic fluid can be fully liquid at ambient temperature and pressure, can be an easily melted solid, e.g., one which becomes liquid at temperatures in the range from about 0 deg. C to about 60 deg. C, or can comprise a mixture of liquid and vapor phases at ambient temperatures and pressures, e.g., at 25 deg. C and 1 atm. pressure. Thus, the essential lipophilic fluid is not a compressible gas such as carbon dioxide. It is preferred that the lipophilic fluid herein be nonflammable or have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum (e.g. body soil) as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines, while unsuitable for use as lipophilic fluid, may be present as one of many possible adjuncts present in the lipophilic fluid. Other suitable lipophilic fluids include diol solvent systems e.g., higher diols such as C6- or C8- or higher diols; organosilicone solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN® and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. Notably, SF-1528 fluid is 90% cyclopentasiloxane (D5).

Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the test fluid will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow@~1.5 ml/min.
Split Vent@~250–500 ml/min.
Septum Purge@ 1 ml/min.
Injection: HP 7673 Autosampler, 10 ul syringe, 1 ul injection
Injector Temperature: 350° C.
Detector Temperature: 380° C.
Oven Temperature Program: initial 60° C., hold 1 min.
rate 25° C./min.
final 380° C., hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid can be present in a mixture, e.g., with water, at approximately the ratio to be used in the final lipophilic fluid that will come into contact with fabric articles. Certain materials that remove sebum and which otherwise qualify for use as lipophilic fluids, for example, ethyl lactate can be quite objectionable due to its tendency to dissolve buttons. If such a material is to be used in the lipophilic fluid, it will be formulated with water and/or other solvents such that the overall mix is not substantially damaging to buttons. Other lipophilic fluids, D5 for example, meet the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at typical or atypical levels. Adjunct materials that are catalytic, for example enzymes, can be used in "forward" or "reverse" modes, a discovery independently useful from the present invention. For example, a lipolase or other hydrolase may be used, optionally in the presence of alcohols as adjuncts, to convert fatty acids to esters, thereby increasing their solubility in the lipophilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

The compositions may comprise emulsifiers. Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifiers/surfactants are commercially available.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—(OCH$_2$CH$_2$)$_a$OH a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013, 683 Hill et al.,.

Suitable cationic surfactants include, but are not limited to, dialkyldimethylammonium salts having the formula:

R'R"N⁺(CH₃)₂X⁻

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.,.

Suitable silicone surfactants include, but are not limited to the polyalkyleneoxide polysiloxanes having a dimethyl polysiloxane hydrophobic moiety and one or more hydrophilic polyalkylene side chains and have the general formula:

$R^1—(CH_3)_2SiO—[(CH_3)_2SiO]_a—[(CH_3)(R^1)SiO]_b—Si(CH_3)_2—R^1$ wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

$—(CH_2)_nO(C_2H_4O)_c(C_3H_6O)_dR^2$ with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. Nos. 5,705,562 and 5,707,613, both to Hill.

Examples of this type of surfactants are the Silwet® surfactants available from CK Witco, OSi Division, Danbury, Conn. Representative Silwet surfactants are as follows.

| Name | Average MW | Average a + b | Average total c |
|------|------------|---------------|-----------------|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers that provide molecular weights within these ranges.

However, the number of ethyleneoxy units ($—C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112. Another suitable silicone surfactant is SF-1488, which is commercially available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems." Further suitable nonionic detergent surfactants are generally disclosed in U.S. Pat. No. 3,929,678, Laughlin et al., issued Dec. 30, 1975, at column 13, line 14 through column 16, line 6.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners that have a fatty acyl group which has an iodine value of above 20, such as N,N-di(tallowoyl-oxyethyl)-N,N-dimethyl ammonium methylsulfate. However, it is to be understood that the term "antistatic agent" is not to be limited only to this subset of fabric softeners and includes all antistatic agents.

Although the methods and/or compositions utilized in present invention will be described in detail, it should be understood, and one skilled in the art will recognize, that any compositions, processes, and/or apparati capable of carrying out the invention could be used.

Absorbent Materials
Hydrogel-Forming Absorbent Polymers

The absorbent polymers of the present invention preferably comprise at least one hydrogel-forming absorbent polymer (also referred to as hydrogel-forming polymer). Hydrogel-forming polymers useful in the present invention include a variety of water-insoluble, but water-swellable polymers capable of absorbing aqueous liquids. Such hydrogel-forming polymers are well known in the art and any of these polymers are useful in the present invention.

The hydrogel-forming absorbent polymers useful in the present invention can have a size, shape and/or morphology varying over a wide range. These polymers can be in the form of particles that do not have a large ratio of greatest dimension to smallest dimension (e.g., granules, pulverulents, interparticle aggregates, interparticle crosslinked aggregates, and the like) and can be in the form of fibers, sheets, films, foams, flakes and the like. The hydrogel-forming absorbent polymers can also comprise mixtures with low levels of one or more additives, such as for example powdered silica, zeolites, activated carbon, molecular sieves, surfactants, glue, binders, and the like. The components in this mixture can be physically and/or chemically associated in a form such that the hydrogel-forming polymer component and the non-hydrogel-forming polymer additive are not readily physically separable. The hydrogel-forming absorbent polymers can be essentially non-porous (i.e., no internal porosity) or have substantial internal porosity.

Other Gelling Polymers

Gels based on acrylamide are also suitable for use in the present invention. Specifically suitable are acrylamide, 2-(acryloyloxyl)ethyl acid phosphate, 2-acyrlamido-2-methylpropanesulfonic acid, 2-dimethylaminoethyl acrylate, 2,2'-bis(acrylamido)acetic acid, 3-(methacrylamido)propyltrimethylammonium chloride, acrylamidomethylpropanedimethylammonium chloride, acrylate, acrylonitrile, acrylic acid, diallyldimethylammonium chloride, diallylammonium chloride, dimethylaminoethyl acrylate, dimethylaminoethyl methacrylate, ethylene glycol, dimethacrylate, ethylene glycol monomethacrylate, methacrylamide, methylacrylamidopropyltrimethylammonium chloride, N,N-dimethylacrylamide, N-[2 [[5-(dimethylamino)1-naphthaleny]sulfonyl]amino[ethyl]-2-acrylamide, N-[3-dimehtylamino)propyl]acrylamide hydrochloride, N-[3-(dimethylamino)propyl) methacrylamide hydrochloride, poly(diallyldimethylammonium chloride), sodium 2-(2-carboxybenzoyloxy)ethyl methacrylate, sodium acrylate, sodium allyl acetate, sodium methacrylate, sodium styrene sulfonate, sodium vinylacetate, triallylamine, trimethyl(N-acryloyl-3-aminopropyl)ammonium chloride, triphenylmethane-leuco derivatives, vinyl-terminated polymethylsiloxane, N-(2-ethoxyethyl)acrylamide, N-3-(methoxypropyl)acrylamide, N-(3-ethoxypropyl) acrylamide, N-cyclopropylacrylamide, N-n-propylacrylamide, and N-(tetrahydrofurfuryl)acrylamide.

Also suitable are the gels based on N-isopropylacrylamide. These can include N-isopropylacrylamide, 2-(diethylamino)ethyl methacrylate, 2-(dimethylamino)ethyl methacrylate, 2-acrylamido-2-methyl-1-propanesulfonacrylate, acrylic acid, acrylamide alkyl methacrylate, bis(4-dimethylamino)phenyl)(4-vinylphenyl)methyl leucocyanide, Concanavalin A (Lecithin), hexyl methacrylate, lauryl methacrylate, methacrylic acid, methacrylamidopropyltrimethylammonium chloride, n-butyl methacrylate, poly(tetrafluoroethylene), polytetramethylene ether glycol, sodium acrylate, sodium methacrylate, sodium vinyl sulfonate, and vinyl-terminated polymethylsiloxane.

Also suitable are the gels based on N,N'-diethylacrylamide. These can include N,N'-diethylacrylamide, methyacrylamidopropyltrimethylammonium chloride, N-acryloxysuccinimide ester, N-tert-butylacrylamide, and sodium methacrylate.

Gels based on acrylate are also suitable. These may include 2-dimethylaminoethyl acrylate, 2-acrylamido-2-methylpropanesulfonic acid, acrylamide, triallylamine, acrylate, acrylamide, methyl methacrylate, divinylbenzene, N,N-dimehtylaminoethyl methacrylate, poly(oxytetramethylene dimethacrylate), poly(2-hydroxyethyl methacrylate), poly(2-hydroxypropyl methacrylate), and polyethylene glycol methacrylate.

Also suitable are the gels based on various monomers. These can include acrylic acid, methacrylamidopropyltrimethylammonium chloride, Collagen, dipalmitoylphosphatidylethanolamine, poly[4-6-decadiene-1,10-diolbis(n-butoxycarbonylmethyl urethane)], poly[bis [aminoethoxy)ethoxy]phosphazene], poly[bis [(butoxyethoxy)ethoxy]phosphazene], poly[bis [ethoxyethoxy)ethoxy]phosphazene], poly[bis [methoxyethoxy)ethoxy]phosphazene], poly[bis [methoxyethoxy)phosphazene], polydimethylsiloxane, polyethylene oxide, poly(ethylene-dimethylsiloxane-ethylene oxide), poly(N-acrylopyrrolidine), poly[n,n-dimethyl-N-[(methacryloyloxyethyl]-N-(3-sulfopropyl) ammonium betaine], polymethacrylic acid, polymethacryloyl dipeptide, polyvinyl alcohol, polyvinyl alcohol-vinyl acetate, polyvinyl methyl ether, furan-modified poly(n-acetylethylene imine), and malein imide-modified poly(n-acetylethylene imine).

Also suitable are the gels disclosed in U.S. Pat. Nos. 4,555,344, 4,828,710, and European Application EP 648, 521 A2 (all of which are herein incorporated by reference).

High Surface Area Materials

In addition to the osmotic absorbent (for example, hydrogel-forming absorbent polymers), the present invention can comprise a high surface area material. It is this high surface area material that provides, either itself or in combination with the hydrogel-forming absorbent polymer, the separation apparatus or vessel with high capillary sorption absorbent capacity.

The high surface area material may be fibrous (hereafter referred to as "high surface area fibers") in character, so as to provide a fibrous web or fibrous matrix when combined with the hydrogel-forming absorbent polymer or other osmotic absorbent. Alternatively, the high surface area material will be an open-celled, hydrophilic polymeric foam (hereafter referred to as "high surface area polymeric foams" or more generally as "polymeric foams").

In addition to these fibers, the skilled artisan will recognize that other fibers well known in the absorbency art may be modified to provide high surface area fibers for use herein. Representative fibers that may be modified to achieve high surface areas required by the present invention are disclosed in U.S. Pat. No. 5,599,335, supra (see especially columns 21–24), incorporated herein by reference.

Spacers

The spacer materials suitable for use in the present invention include any fibrous or particulate material that is insoluble in water. The spacer can be dispersed throughout a matrix of absorbent material in order to improve its permeability above that of a matrix made up of an absorbent material alone; or, the spacer can be used to maintain permeability even after the absorbent material swells and/or gels upon exposure to water. Therefore, the spacer helps reduce the pressure drop across an absorbent material matrix when a water-bearing fluid is passed through the matrix. In addition, if the absorbent material is prone to congealing after exposure to water and subsequent collapse, the spacer can aid in the reduction or prevention of gel congealing upon collapse.

Non-limiting examples of suitable water-insoluble spacer materials include sand, silica, aluminosilicates, glass microspheres, clay, layered silicates, wood, natural textile materials, synthetic textile materials, alumina, aluminum oxide, aluminum silicate, titanium oxide, zinc oxide, molecular sieves, zeolites, activated carbon, diatomaceous earth, hydrated silica, mica, microcrystalline cellulose, montmorillonite, peach pit powder, pecan shell powder, talc, tin oxide, titanium dioxide, walnut shell powder, and particles of different metals or metal alloys. Also useful are particles made from mixed polymers (e.g., copolymers, terpolymers, etc.), such as polyethylene/polypropylene copolymer, polyethylene/propylene/isobutylene copolymer, polyethylene/styrene copolymer, and the like.

Absorbent Matrix

In order to increase the "dry" absorbent matrix permeability or maintain the permeability of the absorbent matrix when it is wet, it is important to provide an sufficient absorbent material to spacer, and, optionally, high surface area material ratio. Since the weight of possible spacers can vary greatly with respect to the weight of the absorbent material, the proportion must be quantified on a "dry" volumetric basis. "Net matrix volume" is the volume of the absorbent materials, spacers, and, optionally, any high surface area materials not including any inner volume the materials themselves may contain or any volume attributable to inner material void spaces. "Inner material void volume" is the cumulative volume of voids between material particles and/or fibers that typically and naturally occur when particles and/or fibers occupy a given space. "Dry bulk matrix volume" is equal to the net matrix volume combined with the inner material void volume on a dry basis. With respect to the present invention, it is preferred that the absorbent material is from 50 to 100%, more preferably from 75 to 95%, of the dry bulk matrix volume. It is preferred that the spacer is from 1 to 50%, more preferably from 5 to 25%, of the dry bulk matrix volume. It is preferred that the optional high surface area material be from 1 to 50%, more preferably from 5 to 25%, of the dry bulk matrix volume.

The gel materials, spacers, and, optionally, the high surface area materials can be formed into sheets or films or membranes and configured in different ways. The sheet configuration is application-dependent and generally includes four generic configurations, namely, tubes, hollow fibers, plate and frame units, and spiral wound modules, all of which are within the scope of the present invention.

Method Options

The present invention can optionally be combined with several well-known processes to purify fluids. These processes can be used to aid in water-lipophilic fluid separation operations and/or be used to remove impurities from lipophilic fluid after it has been used.

Distillation is the process of producing a vapor from a liquid by heating the liquid in a vessel, then condensing the vapors and collecting them in another vessel. The types of distillation processes available are simple, fractional, steam, immiscible solvent, azeotropic, extractive, vacuum, molecular, entrainer sublimation, and freeze-drying.

Extraction is the selective transfer of a compound or compounds from one liquid to another immiscible liquid or from a solid to a liquid. The former process is called a liquid-liquid extraction and is an indirect separation technique because two components are not separated directly. A foreign substance, an immiscible liquid is introduced to provide a second phase.

"Decantation" and "density gradation" are gravity-type separation methods. A "decanter" is defined as a vessel used to separate a stream continuously into two liquid phases using the force of gravity. Using Stokes' law, one can derive the settling velocity of the droplets in the continuous phase and design a decanter accordingly.

Ion exchange is a process whereby one type of ion in a compound is exchanged for a different ion of the same type: a cation for another cation and anion for another anion. Ion-exchange resins are typically utilized to carry out the exchange. All ion-exchange resins, whether cation or anion exchangers, strongly or weakly ionized, gel or macroporous, spherical or granular, can be viewed as solid solutions. Practically every observed ion-exchange behavior can be rationalized on the basis of distribution of components between two solutions phases, one of which is confined as a solid phase. Transfer of components takes place across the interface between the phases, which is the surface of the bead or granule. The inside phase of an ion-exchange resins contains four necessary components. The components include: a three-dimensional polymeric network, ionic functional groups permanently attached to the network, counterions, and a solvent. Under certain conditions, there may be other components inside the resin such as a second solvent, co-ions, and nonionic solutions.

Adsorption, by e.g. activated carbon, is an important unit operation for separation of liquids and utilizes surface phenomenon occurring on the surface of an adsorbent material. Adsorption occurs when the energy associated with a surface of a solid attracts molecular or ionic species from the liquid to the solid. The adsorbed material can form a layer on the surface from one to several molecules deep. The amount and properties of the surface and the environmental conditions at the surface will control adsorption. A number of highly porous solids adsorb water preferentially when contacted by wet solvent mixtures and can remove water to very low concentrations. While they can be used on a once-through basis, they are capable of being regenerated by heating. Molecular sieves are commonly used; however, organic adsorbents of the ion-exchange resin type are attractive alternatives.

Chromatography is a multistage separation technique based on the differences between compounds in adsorbing onto a surface or dissolving in a thin film of liquid. The more common chromatography types are paper, thin layer, high performance, gas, and gel permeation. The two major mechanisms at work during a chromatographic separation are displacement and partition.

Dialysis is the transfer of solute through a membrane as a result of a trans-membrane gradient in the concentration of the solute. It is accompanied by osmosis, which is a transfer of a solvent through a membrane as a result of a trans-membrane gradient in the concentration of the solvent. The direction of a solute transfer in dialysis is opposite that of solvent transfer in osmosis. Dialysis is effective in the removal of low molecular weight solute molecules or ions from a solution via their passage through a semi-permeable membrane driven by a concentration gradient.

Electro-dialysis is a process whereby the electrolytes are transferred through a system of solutions and membranes by an electrical driving force. As currently used, the term electro-dialysis refers to a multiple-compartment electro-dialysis with ion-exchange membranes. There are four variations of electrodialysis: electrolytic, concentration-diluting, ion substitution, and reversal.

Diafiltration differs from conventional dialysis in that the rate of microspecies removal is not dependent on concentration but is simply a function of the ultrafiltration rate (membrane area) relative to the volume to be exchanged or dialyzed. Repeated or continuous addition of fresh solvent flushes out or exchanges salts and other microspecies efficiently and rapidly.

Solids can be designed to adsorb water while rejecting solvents. Likewise, membranes can be designed to pass water and retain solvents or vice versa. The use of pervaporation for removing water from solvent-water mixtures involves the use of a hydrophilic membrane. The removal of solvents from water is identical except for the use of a membrane that rejects water but is lipophilic.

Crystallization is the process of producing crystals from a vapor, a melt, or a solution and is distinguished from precipitation in that the latter usually exhibits extremely high levels of super-saturation, primary nucleation, and low solubility ratios.

Centrifugation is a technique that separates materials based upon differences in density, the rate of separation being amplified by applying increasing rotational force. The force is called a centrifugal force and the apparatus providing the rotational force is called a centrifuge.

Cartridge filtration is used primarily for the removal of solids from liquids. Specifically, low-solids-containing liquids are filtered such that they become optically clear solutions. The cartridges are cylindrical in configuration, with either pleated or non-pleated, disposable or cleanable, filter media. The filter media is usually integrally bonded to plastic or metal hardware.

Sedimentation is the separation of suspended solid particles from a liquid stream via gravitational settling. Sedimentation can also be used to separate solid particles based on differences in their settling rates.

Air stripping is a method whereby many organic solvents can be removed from wastewater to a level at which the water can be discharged. This method applies particularly to solvents that have a low solubility in water or a high volatility relative to water.

Desiccant Drying involves bringing a water-wet solvent into contact with a solid, usually an electrolyte, suited to withdraw the water and form a second phase. Water can then be removed from this second phase by other means (e.g. decantation).

Chemical Addition involves the addition of chemicals to change at least one physico-chemical property of the liquid such as pH, ionic strength, etceteras. Examples of these chemicals include salts, acids, bases, coagulants, and flocculants.

Enzyme, microbial, or bacterial addition involves the addition of enzymes, microbes, or bacteria to a waste stream to remove organic contaminants from the stream.

Temperature modification enhances the separation of binary mixtures and can include both cooling and/or heating of the mixture. Increasing the temperature of the mixtures aids coalescence while cooling aids the crystallization or freezing of one of the components.

Electrostatic coalescence involves exposing an emulsion containing two mutually insoluble phases (for example lipophilic fluid and water), wherein one phase is the continuous phase and the other is the discontinuous phase, to an electric field to affect coalescence of the discontinuous phase into droplets of a large enough size such that the droplets gravitate from the emulsion based on the density difference of the two phases. In order to carry this method out, the two phases must have at least a minor difference in dielectric constants and densities. Electric coalescence is a well-known process and is described in U.S. Pat. No. 3,207,686 to Jarvis et al.; U.S. Pat. No. 3,342,720 to Turner; U.S. Pat. No. 3,772,180 to Prestridge; U.S. Pat. No. 3,939,395 to Prestridge; U.S. Pat. No. 4,056,451 to Hodgson; U.S. Pat. No. 4,126,537 to Prestridge; U.S. Pat. No. 4,308,127 to Prestridge; and U.S. Pat. No. 5,861,089 to Gatti et al.

Absorption involves exposing an emulsion to a material that "absorbs" at least one component out of the emulsion. The absorbent material typically undergoes a volume change (either swelling or shrinkage) as contrasted with adsorption, which is primarily a surface phenomenon. In one example, one could utilize absorbent polymers to remove water from a solvent-water emulsion.

Process

The present invention is directed to a process for treating a lipophilic fluid contained in an emulsion made up, at least, of water and lipophilic fluid. The process includes the steps of pretreating the emulsion, recovering the lipophilic fluid from the emulsion, and purifying the lipophilic fluid. The process can further include the steps of first exposing a fabric to lipophilic fluid and water and then collecting the lipophilic fluid and water in the form of an emulsion. The process can optionally include a mixing step wherein at least a portion of the lipophilic fluid and at least a portion of the water are mixed to form an emulsion prior to exposure to the fabrics. An emulsifier can also be added during the mixing step.

If it does contain emulsifier, the emulsion may contain up to about 10% emulsifier by weight. It is preferable for the lipophilic fluid and water emulsion to have a water/lipophilic fluid/emulsifier ratio of from about 1/98.9/0.1 to about 40/55/5 by weight of the emulsion. Lastly, as discussed in the "Adjunct Ingredients" section, the emulsifiers can act as surfactants as well.

It is preferred that the lipophilic fluid includes a linear siloxane, a cyclic siloxane, and mixtures of these siloxanes. It is more preferable that these siloxanes are selected from the group consisting of octamethylcyclotetrasiloxane, decamethylcyclopentasiloxane, dodecamethylcyclohexasiloxane, and mixtures of these siloxanes. It is even more preferred if the lipophilic fluid contains decamethylcyclopentasiloxane. Lastly, it is most preferred if the lipophilic fluid contains decamethylcyclopentasiloxane and is substantially free of octamethylcyclotetrasiloxane.

The "collecting" step of the present invention may be carried out in several ways. Spinning the fabric load, including the lipophilic fluid and water is well known in conventional laundry applications. Wringing or twisting or squeezing the treated fabrics is also a well-known mechanical way to extract fluids from fabrics and fabric articles. Evaporation may also be employed to collect the lipophilic fluid and water and/or to dry the fabric load. Heating the fabric load, lipophilic fluid and water or other well-known means for evaporation may do this. Spinning and/or tumbling may be coupled with heating to assist evaporation and evaporation uniformity. If this method is employed, it will require subsequent condensation of the lipophilic fluid and water followed by the recovery and purification steps.

The "pre-treating" step can be carried out in a number of conventional ways. Non-limiting examples of the pre-treating methods include sedimentation, centrifugation, cyclonic action exposure, decantation, filtration, chemical addition, and temperature modification. The pre-treatment regimen can include combinations of the aforementioned methods as well.

If filtration is carried out, it is desirable to pass the lipophilic fluid and water emulsion through a particulate matter filter such that particles and particle aggregates about 25 micron or larger are removed, preferably such that particles and particle aggregates about 15 microns or larger are removed, more preferably such that particles and particle aggregates about 10 microns or larger are removed, even more preferably such that particles and particle aggregates about 5 microns or larger are removed, even more preferably such that particles and particle aggregates about 1 microns or larger are removed. It is further possible expose the lipophilic fluid and water emulsion to activated carbon for further pre-treatment.

The "recovering" step likewise can be carried out in a number of well-known ways. Non-limiting examples of recovering methods include mechanical coalescence, electric coalescence, chemical addition, membrane filtration, temperature modification, air stripping, microbial addition, absorbent material exposure, centrifugation, distillation, adsorption, absorption, crystallization, precipitation, temperature modification, diafiltration, electrolysis, extraction, pH modification, and ionic strength modification. One of the many possible ways to carry out adsorption is to expose the emulsion to activated carbon. The recovery regimen can include combinations of the aforementioned methods as well.

The "purifying" step can be carried out in a number of ways. Non-limiting examples include membrane filtration, distillation, extraction, stripping, enzyme addition, ion exchange, desiccant drying, chromatography, and adsorption. The purification regimen can include combinations of the aforementioned methods as well.

The present invention is also directed to process for purifying a lipophilic fluid and a lipophilic fluid vapor. The process includes the steps of collecting the lipophilic fluid vapor and a first emulsion containing water and lipophilic fluid. Next, the lipophilic fluid vapor is condensed to form condensed lipophilic fluid vapor. The condensed lipophilic fluid vapor is combined with the first emulsion to form a second emulsion. The second emulsion can then be pretreated as described above. After pretreatment, the lipophilic fluid and condensed lipophilic fluid vapor can be recovered from the second emulsion with the same methods described above. After recovery from the emulsion, the lipophilic fluid and condensed lipophilic fluid vapor are purified in accordance with the above-described methods. As in the first embodiment, this process can also optionally include the steps of first exposing a fabric to lipophilic fluid and water and then collecting the lipophilic fluid and water in the form of the first emulsion. The process can optionally include a mixing step wherein at least a portion of the lipophilic fluid and at least a portion of the water are mixed to form the first emulsion prior to exposure to the fabrics. An emulsifier can also be added during the mixing step.

Any of the compositions or emulsion hereinbefore discussed may further contain adjunct ingredients selected from the "Adjunct Ingredients" section hereinbefore including, but not limited to, enzymes, bleaches, surfactants, fabric softeners, perfumes, antibacterial agents, antistatic agents, brighteners, dye fixatives, dye abrasion inhibitors, anticrocking agents, wrinkle reduction agents, wrinkle resistance agents, soil release polymers, sunscreen agents, antifade agents, builders, sudsing agents, composition malodor control agents, composition coloring agents, pH buffers, waterproofing agents, soil repellency agents, and mixtures of these adjuncts.

The methods and systems of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the process of the present invention in addition to conventional processes, such as an aqueous wash.

The methods of the present invention may also be performed in an apparatus, which is not a modified existing apparatus but is one specifically built in such a manner so as to conduct the present invention or may be added to another apparatus as part of a lipophilic fluid processing system. This would include all the associated plumbing, such as connection to a chemical and water supply, and sewerage for waste wash fluids.

The systems of the present invention may be used in an apparatus, which is not a modified existing apparatus but is one specifically built in such a manner so as to conduct the present invention and, possibly, conventional processes, such as an aqueous wash.

The methods of the present invention may also be performed in an apparatus capable of "dual mode" functions. A "dual mode" apparatus is one capable of both washing and drying fabrics within the same drum. These apparati are widely available, especially in Europe.

An apparatus used to carry out the present invention will typically contain some type of control system. These include electrical systems, such as, the so-called smart control systems, as well as more traditional electromechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the system of the present invention is only a part of a cleaning system, the so called "smart system" could be communicating with the other cleaning devices which would be used to complete the remainder of the cleaning process, such as a washing machine, and a dryer.

What is claimed is:

1. A process for treating an emulsion comprising water and a lipophilic fluid, said process comprising the sequential steps of:
   a. forming said emulsion by mixing at least a portion of said lipophilic fluid and at least a portion of said water to form said emulsion;
   b. exposing a fabric to said emulsion and collecting said emulsion;
   c. pretreating said emulsion, wherein said pretreating step is selected from the group comprising sedimentation, centrifugation, cyclonic action exposure, decantation, filtration, temperature modification, and combinations thereof;
   d. recovering said lipophilic fluid from said emulsion, wherein said recovering step is selected from the group comprising mechanical coalescence, electric coalescence, chemical addition, membrane filtration, temperature modification, air stripping, microbial addition, absorbent material exposure, centrifugation, distillation, adsorption, absorption, crystallization, precipitation, diafiltration, electrolysis, extraction, pH modification, ionic strength modification, and combinations thereof; and
   e. purifying said lipophilic fluid, wherein said purifying step is selected from the group consisting of distillation, extraction, stripping, enzyme addition, ion exchange, desiccant drying, adsorption, and combinations thereof.

2. A process according to claim 1 wherein said emulsion is formed prior to said exposing step.

3. A process according to claim 1 wherein an emulsifier is added to said lipophilic fluid and said water to form said emulsion during said forming step.

4. A method according so claim 1 wherein said collecting step comprises spinning said fabrics, said lipophilic fluid, and said water.

5. A method according to claim 1 wherein said collecting step comprises wringing said fabrics.

6. A method according to claim 1 wherein said collecting step comprises evaporating as least a portion of said lipophilic fluid and at least a portion of said water and condensing at least a portion of said lipophilic fluid and at least a portion of said water.

7. A process according to claim 1 wherein said pretreating step comprises passing said emulsion through a filter such that particles and particle aggregates about 1 micron or larger are removed.

8. A process according to claim 1 wherein said recovering step is adsorption which comprises exposing said emulsion to activated carbon.

9. A process according to claim 1 wherein said emulsion comprises up to about 10% emulsifier by weight of the emulsion.

10. A process according to claim 9 wherein said emulsion comprises a water/combined lipophilic fluid and condensed lipophilic fluid vapor/emulsifier ratio of from about 1/98.9/0.1 to about 40/55/5 by weight of said emulsion.

11. A process according to claim 9 wherein said emulsifier comprises a surfactant.

12. A process according to claim 1 wherein said lipophilic fluid comprises a linear siloxane, a cyclic siloxane, or mixtures thereof.

13. A process according to claim 1 wherein said lipophilic fluid comprises a lipophilic fluid selected from the group consisting of octamethylcyclotetrasiloxane, decamethylcyclopentasiloxane, dodecamethylcyclohexasiloxane, and mixtures thereof.

14. A process according to claim 1 wherein said lipophilic fluid comprises decamethylcyclopentasiloxane.

15. A process according to claim 1 wherein said lipophilic fluid comprises decamethylcyclopentasiloxane and is substantially free of octamethylcyclotetrasiloxane.

16. A process according to claim 1 wherein said emulsion also comprises adjunct ingredients selected from the group consisting of enzymes, bleaches, surfactants, fabric softeners, perfumes, antibacterial agents, antistatic agents, brighteners, dye fixatives, dye abrasion inhibitors, anticrocking agents, wrinkle reduction agents, wrinkle resistance agents, soil release polymers, sunscreen agents, antifade agents, builders, sudsing agents, composition malodor control agents, composition coloring agents, pH buffers, waterproofing agents, soil repellency agents, and mixtures thereof.

* * * * *